US006488285B1

(12) United States Patent
Allard

(10) Patent No.: US 6,488,285 B1
(45) Date of Patent: Dec. 3, 2002

(54) HYDRAULIC CHUCK WITH DEFORMABLE GRIPPING SLEEVE

(75) Inventor: Mats Allard, Forsbacka (SE)

(73) Assignee: Sandvik Aktiebolag, Sandviken (SE)

(*) Notice: Subject to any disclaimer, the term of this patent is extended or adjusted under 35 U.S.C. 154(b) by 0 days.

(21) Appl. No.: 09/937,824
(22) PCT Filed: Feb. 23, 2000
(86) PCT No.: PCT/SE00/00364
§ 371 (c)(1),
(2), (4) Date: Dec. 20, 2001
(87) PCT Pub. No.: WO00/58045
PCT Pub. Date: Oct. 5, 2000

(30) Foreign Application Priority Data

Mar. 30, 1999 (SE) ................................................ 9901173

(51) Int. Cl.⁷ ....................... B23B 31/117; B23B 31/30; B23P 11/02
(52) U.S. Cl. .......................... 279/4.03; 29/446; 29/450; 29/243; 403/15; 403/273; 279/9.1; 279/102; 279/158
(58) Field of Search .............................. 279/2.07, 2.08, 279/4.01, 4.03, 9.1, 96, 102, 103, 158, 903; 29/450, 451, 446, 243; 269/20, 48.1; 242/571.1, 571.2, 576.1; 403/5, 15, 273; 294/98.1, 119.3

(56) References Cited

U.S. PATENT DOCUMENTS

| 3,989,260 A | * 11/1976 | Zonkov et al. ............ 279/4.01 |
| 4,387,906 A | 6/1983 | Nicolin |
| 4,677,792 A | 7/1987 | Speidel |
| 5,127,780 A | 7/1992 | Massa |
| 5,845,384 A | * 12/1998 | Retzbach ..................... 29/450 |
| 6,131,916 A | * 10/2000 | Toda ........................... 279/9.1 |
| 6,224,067 B1 | 5/2001 | Lindstrom |

FOREIGN PATENT DOCUMENTS

| DE | 29 26 293 | 1/1981 | |
| SU | 975232 A | * 11/1982 | ............... 279/2.08 |
| WO | WO98/32563 | 7/1998 | |

* cited by examiner

Primary Examiner—Steven C. Bishop
(74) Attorney, Agent, or Firm—Burns, Doane, Swecker & Mathis, LLP

(57) ABSTRACT

A hydraulic chuck includes a center bore for receiving a tool shank. At least one closed cavity is disposed in the chuck body adjacent the bore and extend circumferentially by a distance less than 360 degrees. The cavity containing device communicates with the medium for pressurizing the medium to radially deform and expand the bore wall from a normal diameter to a larger diameter to enable the tool shank to be moved into or from the bore. A depressurizing of the medium causes the bore wall to radially retract to the normal diameter for clamping the member in the bore.

23 Claims, 4 Drawing Sheets

HYDRAULIC CHUCK WITH DEFORMABLE GRIPPING SLEEVE

BACKGROUND OF THE INVENTION

The present invention relates to a hydraulic chuck and clamping methods, wherein a sleeve is radially deformed to grip an element, such as a tool shank.

Numerous types of chucks have been devised for securely holding tools. Among those are so-called hydraulic chucks, which include a deformable center cylindrical bore for clamping a tool shank. Extending around the bore in radially spaced relationship thereto is a groove filled with an incompressible medium, such as oil. The portion of the chuck between the groove and the bore constitutes a radially deformable sleeve. A pressurizing member, such as a screw (i.e., a threaded piston), communicates with the oil to pressurize the oil when the screw is advanced. In response to the oil being pressurized, the sleeve is deformed in a manner reducing the effective diameter thereof, i.e., reducing the effective inner diameter of an inner wall of the bore, whereby the wall grips the tool shank. When the screw is retracted to depressurize the oil, the sleeve restores itself to its original shape to release the tool shank. Examples of hydraulic chucks are described in U.S. Pat. Nos. 4,387,906; 4,677,792; and 5,127,780.

A shortcoming of such chucks is that the pressure must be maintained during use of the tool. In the event of a pressure failure (e.g., oil leakage), the tool can become accidentally released during use, which not only interrupts the work, but can present a safety risk as well.

Also, the sleeve is typically a thin-walled sleeve, which presents certain additional risks. For example, if the pressure is applied without a tool being present, the sleeve is subjected to excessive deformation, which, over time, can produce enough fatigue to cause breakage (splitting) of the sleeve. If the pressure is applied with a tool only partially inserted, the location where the sleeve contacts an inner edge of the tool shank can have a ridge permanently formed therein. Another type of undesirable deformation can result if the outer surface of the tool shank includes a flat, because the area where the flat is disposed will not offer resistance to the deformation of the wall; hence a flat can become formed in the sleeve.

It is, therefore, an object of the invention to provide a reliable yet relatively inexpensive way of avoiding accidental release of the clamped member.

Another object is to provide a chuck and a clamping method wherein a chuck has a deformable sleeve, which is not prone to breakage or permanent deformations.

SUMMARY OF THE INVENTION

The present invention relates to a hydraulic chuck comprising a chuck body extending in a longitudinal direction and including radially spaced inner and outer surfaces. The inner surface defines a wall of a bore having a longitudinally extending axis. The outer surface is spaced from the bore wall in a direction extending radially outwardly with respect to the axis. At least one closed cavity is disposed in the chuck body in radially spaced relationship to the bore wall and the outer surface. The cavity extends circumferentially by a distance less than the circumference of the chuck body and contains an incompressible medium. A pressurizing device communicates with the medium for pressurizing the medium to radially deform and expand the bore wall from a normal diameter to a larger diameter for enabling a member to be moved into or from the bore. A depressurizing of the medium causes the bore wall to radially retract to the normal diameter for clamping the movable member in the bore.

Preferably, the bore wall includes a longitudinal recess at a location adjacent the at least one cavity.

Preferably there is a plurality of the cavities, and the cavities are interconnected.

The cavities, which can be circumferentially spaced apart and/or radially spaced apart, may have a circular cross-section or a non-circular cross-section.

The invention also pertains to a method of clamping a member utilizing the above-described hydraulic chuck.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION OF PREFERRED EMBODIMENTS OF THE INVENTION

Figure 1:
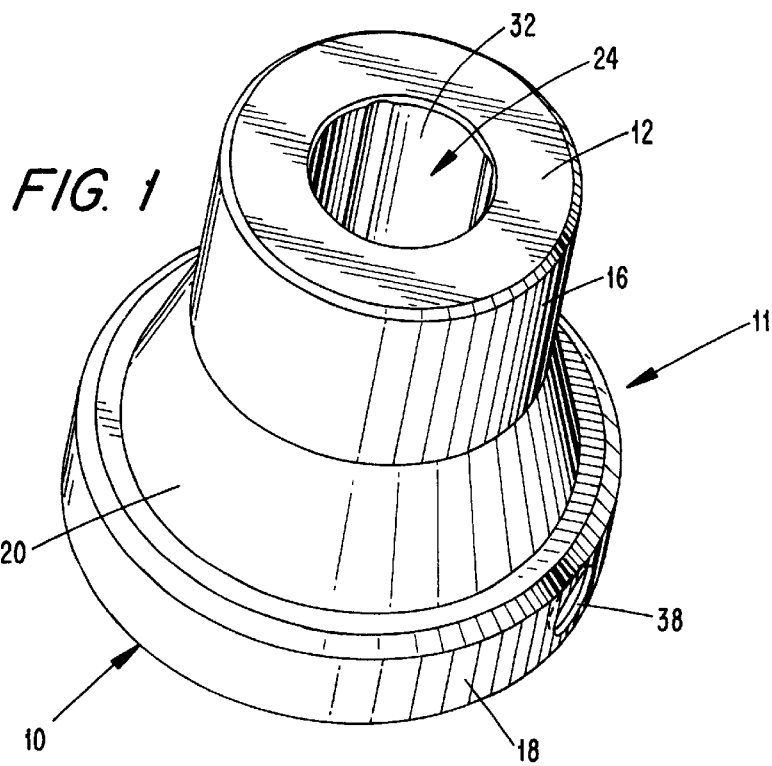
FIG. 1 is a front perspective view of a chuck body according to the present invention.

Depicted in FIGS. 1–6 is a first embodiment of a hydraulic chuck 10 according to the invention.

The chuck 10 includes a chuck body 11 and a coupling 22. The function of the chuck body 11 is to receive a member TS which is to be clamped, and the function of the coupling 22 is to attach the chuck body to a carrier, such as a drive spindle (not shown).

The body 11 has front and rear faces 12, 14. The front face 12 is defined by a cylindrical sleeve 16, and the rear face is defined by a cylindrical flange 18. The sleeve and flange 16, 18 are interconnected by a frustoconical transition part 20.

The coupling 22 is a conventional coupling 22 of any suitable type that is attached to the rear face 14 of the body (e.g., by welding, gluing, brazing, bolting, etc.) to enable the chuck to be able to be attached to a carrier (not shown).

A central bore 24 extends axially within the chuck body, the bore having an opening formed in the front face 12. A forwardly facing radial shoulder 26 is formed inside the body 11. The bore 24 is adapted to receive a tool shank TS (FIGS. 4 and 6) which abuts against the shoulder 26. Alternatively, the shoulder 26 can be eliminated, whereby the tool shank TS abuts against an end surface 22a of the coupling 22.

At least one cavity 30 extending parallel to the axis of the bore is formed in the chuck body. Four cavities 30 are shown in the embodiment depicted in FIGS. 1–6. Each of the cavities 30 is spaced radially from radially spaced inner and outer surfaces 32, 16 of the chuck, the inner surface 32 defining a wall of the bore 24.

Each cavity extends circumferentially less than 360°, i.e., no cavity completely surrounds the bore 24. Preferably no cavity extends circumferentially by more than ninety degrees.

The cavities 30 are closed at their front and rear ends by a front-end wall 34 and the coupling 22, respectively.

Figure 5B:
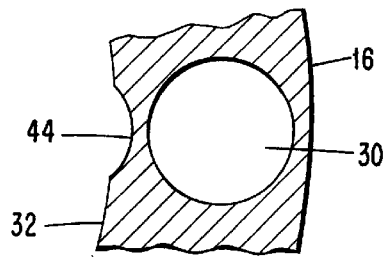
FIG. 5b is an enlargement of a portion of FIG. 5.
Figure 2:
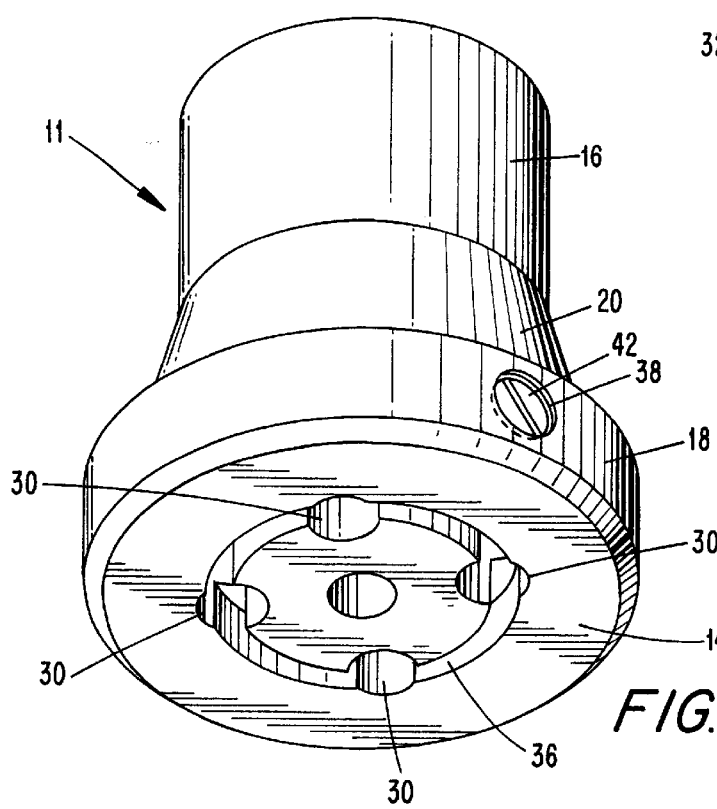
FIG. 2 is a rear perspective view of the chuck body depicted in FIG. 1.
Figure 3:
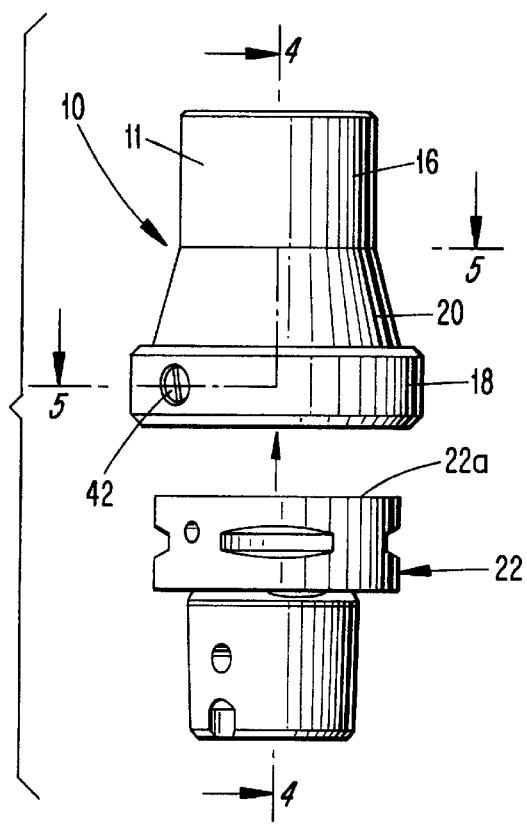
FIG. 3 is an exploded side elevational view of a chuck comprised of the chuck body of FIG. 1, and a coupling.
Figure 4:
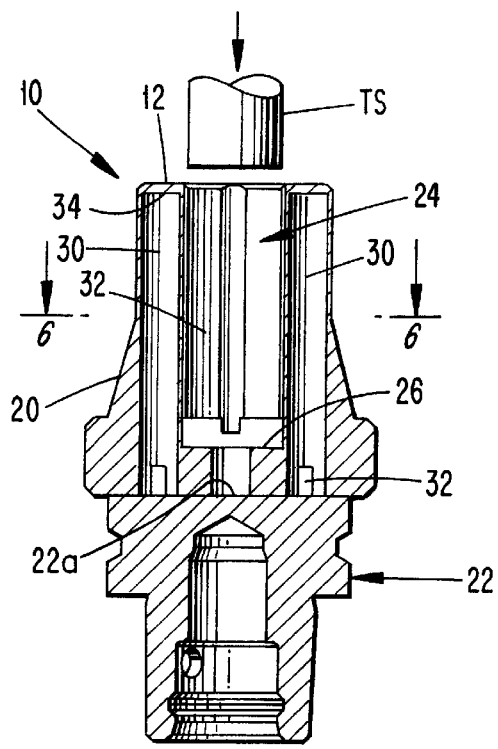
FIG. 4 is a longitudinal sectional view taken along the line 4—4 in FIG. 3 after the coupling has been secured to the chuck body, and showing a tool shank in the process of being inserted into a bore of the tool body.
Figure 5:
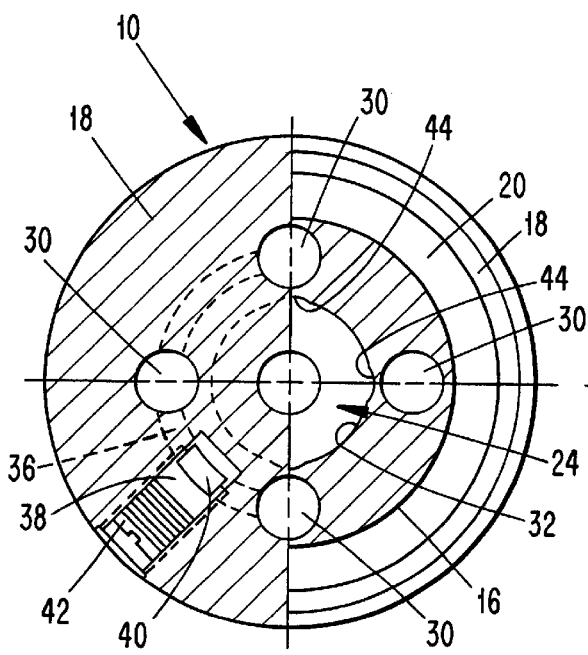
FIG. 5 is a sectional view taken along the line 5—5 in FIG. 3 without a tool shaft mounted in the tool body.

The cavities 30 are spaced apart circumferentially from one another, but communicate with one another by means of a circular connecting channel 36. Communicating with the channel 36 is a radial hole 38 which extends from the outer surface of the chuck body and intersects the channel 36 to form therewith an interconnecting port 40 (FIG. 5).

A pressurizing device in the form of a threaded thrust screw 42 is threadedly mounted in the hole 38. Alternatively, an external pump could be provided, along with a suitable valve, as disclosed subsequently in connection with FIG. 15.

Figure 5A:
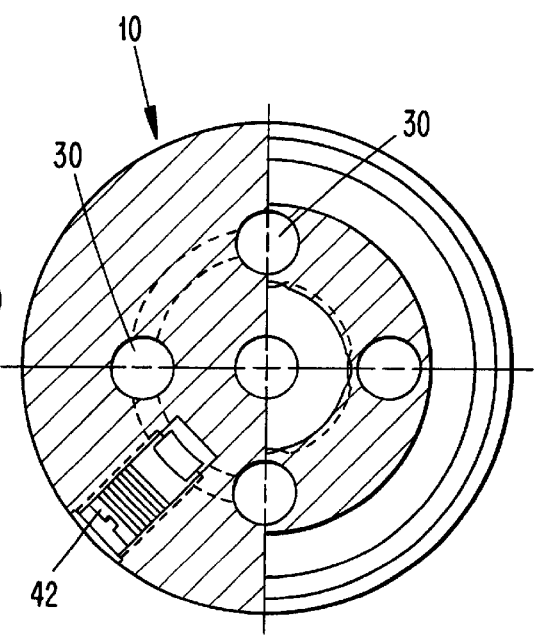
FIG. 5a is a view similar to FIG. 5 showing the manner in which a wall of the bore is deformed in response to manipulation of a pressurizing device increasing the pressure.
Figure 6:
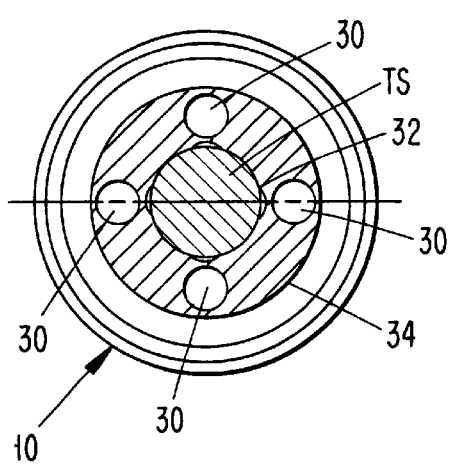
FIG. 6 is a sectional view taken along the line 6—6 in FIG. 4 with a tool shank installed within the chuck.

The cavities 30, the channel 36, and the portion of the hole 38 disposed between the screw 42 and the port 40, are filled with an incompressible medium such as a liquid or silicon gel, for example. Oil is an example of a liquid which could be used, and which can be pressurized by tightening the thrust screw 42. It has been discovered that when the oil disposed in cavities 30 is pressurized sufficiently, the bore wall will deform in such manner that the effective diameter thereof is slightly increased. The wall deformation is shown in broken lines in the right half of FIG. 5a. Longitudinal recesses or indentations 44 (see FIGS. 5 and 5b) are preferably formed in the wall 32 in circumferentially spaced relationship to one another and adjacent respective cavities 30 (four such recesses 44 being disposed in the embodiment according to FIGS. 1–6), to facilitate the deformation of the wall 32.

By deforming the wall 32 to increase (expand) the effective bore diameter, a member to be clamped, such as a tool shank TS, can be inserted into the bore. If the member TS has an outer diameter less than the expanded diameter and greater than the normal (at-rest) diameter of the bore, then that member will be tightly gripped by the bore wall 32 when the hydraulic pressure is released (by retracting the thrust screw 42) or if leakage of the medium occurs. That is, the wall 32 will retract itself to the at-rest state when the hydraulic pressure is released and will close tightly against the member TS.

Thus, it is unnecessary to maintain the hydraulic pressure to clamp the member TS, so there is no need to be concerned about a leakage of oil resulting in an accidental releasing of the member TS.

The cavity structure in the embodiment according to FIGS. 1–6 comprises four cavities of circular cross-section spaced apart by ninety degrees. However, many other cavity structures could be employed, some of which are depicted in FIGS. 7–14, respectively.

Figure 7:
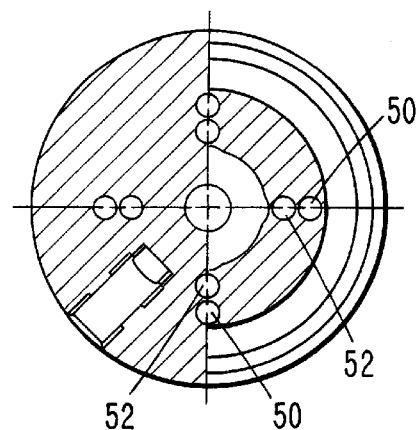
FIG. 7 is a sectional view similar to FIG. 5 of a second embodiment of the chuck body.

In FIG. 7, four pairs of cavities 50, 52 are employed, the cavities of each pair being spaced apart in a radial direction. A connecting channel (not shown) would fluidly interconnect the cavities.

Figure 8:
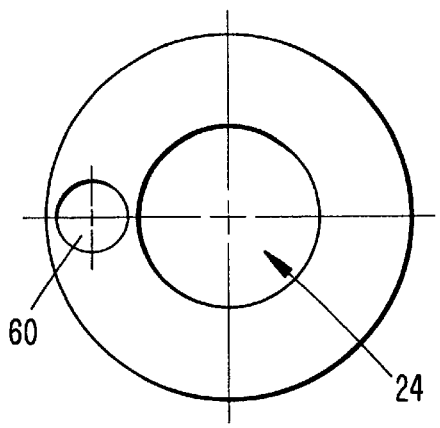
FIG. 8 is a schematic view of a third embodiment of the chuck body.

In FIG. 8, only a single cavity 60, of circular cross-section, is provided.

Figure 9:
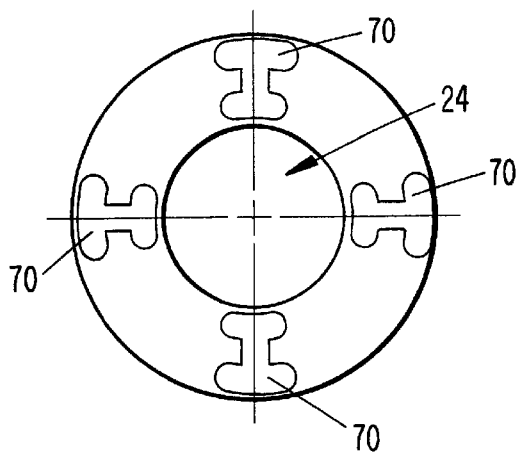
FIG. 9 is a schematic view of a fourth embodiment of the chuck body.

In FIG. 9, the cavities 70 are I-shaped. Four equidistantly spaced cavities 70 are shown, but any suitable number could be employed.

Figure 10:
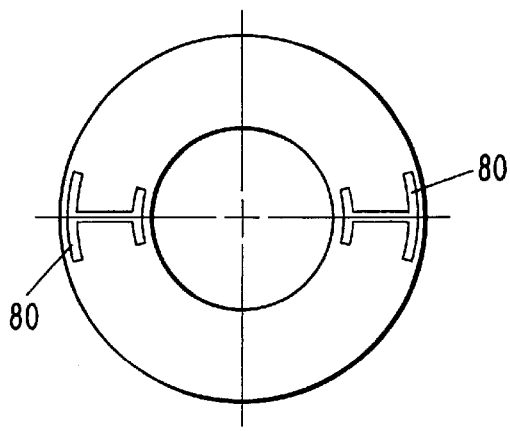
FIG. 10 is a schematic view of a fifth embodiment of the chuck body.

In FIG. 10, two I-shaped cavities 80, spaced apart by 180', are provided, the cavities 80 being thinner than the cavities 70 of FIG. 9. A connecting channel (not shown) would interconnect the cavities 80.

Figure 11:
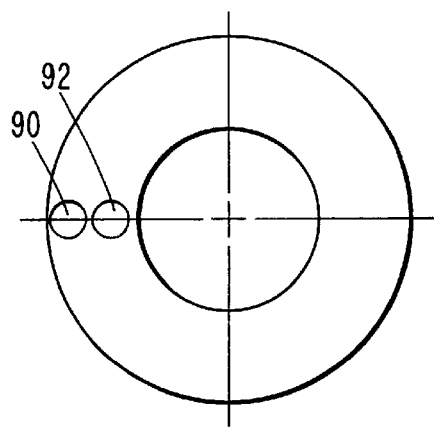
FIG. 11 is a schematic view of a sixth embodiment of the chuck body.

In FIG. 11 a single pair of radially spaced, circular cavities 90, 92 is employed, which would be interconnected by a channel.

Figure 12:
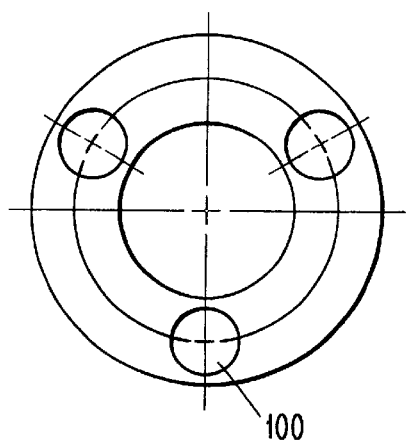
FIG. 12 is a schematic view of a seventh embodiment of the chuck body.
Figure 13:
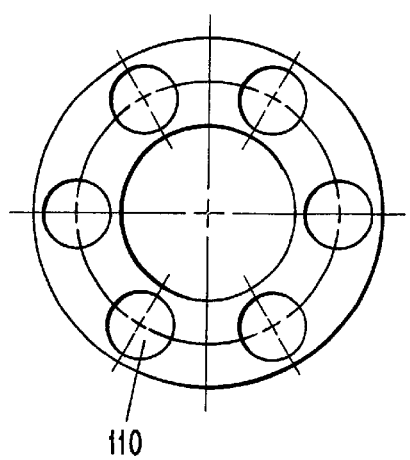
FIG. 13 is a schematic view of an eighth embodiment of the chuck body.
Figure 14:
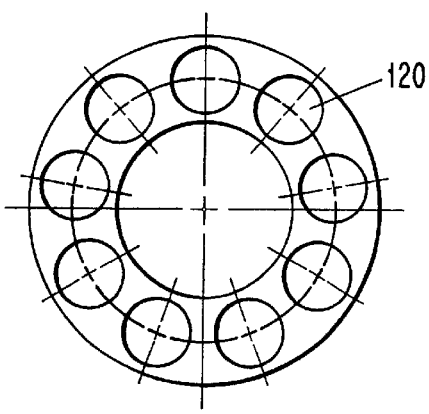
FIG. 14 is a schematic view of a ninth embodiment of the chuck body.

In each of FIGS. 12–14 the cavities are of circular cross-section and equidistantly spaced. In FIG. 12, three cavities 100 are employed. In FIG. 13, six cavities 110 are used. In FIG. 14, nine cavities 120 are provided. The cavities of each of FIGS. 12–14 would be interconnected by a channel.

Figure 15:
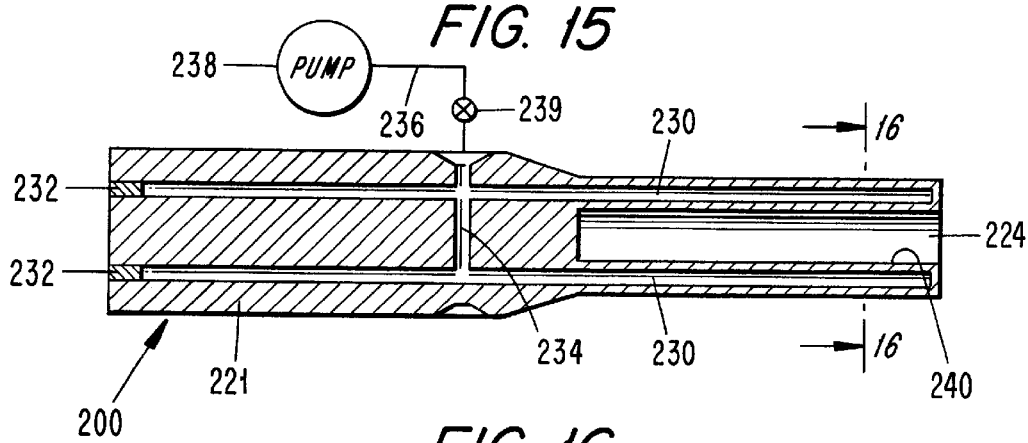
FIG. 15 is a longitudinal sectional view of an other embodiment of a hydraulic chuck.
Figure 16:
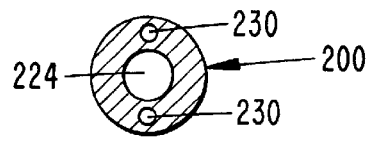
FIG. 16 is a cross sectional view take n along the line 16—16 in FIG. 15.

Another embodiment of the invention is depicted in FIGS. 15 and 16. That embodiment involves a relatively slim chuck 200, which can be used in confined spaces. The chuck includes a chuck body 221 having a central bore 224 drilled in a front end thereof for receiving a tool shank (not shown). A plurality (e.g., a pair) of cavities 230 is drilled through the body 221 so as to extend parallel to and closely adjacent the center bore 224. Rear ends of the cavities are closed by suitable plugs 232. A lateral bore 234 is drilled partially through the body at a location behind the bore 224 to intersect both of the cavities 230. The lateral bore 234 intersects the outer periphery of the body 211 and is connected to a conduit 236 which connects to a pump 238 capable of delivering a pressurized non-compressible medium to the lateral bore 234, and thus to the cavities 230 (under the control of a valve 239) in order to expand the surface 240 of the bore 224 in the manner described earlier herein.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A hydraulic chuck comprising:
   a chuck body extending in a longitudinal direction and including radially spaced inner and outer surfaces, the inner surface defining a wall of a bore having a longitudinally extending axis, the outer surface spaced from the bore wall in a direction extending radially outwardly with respect to the axis;

at least one closed cavity disposed in the chuck body in radially spaced relationship to the bore wall and the outer surface, the at least one cavity extending circumferentially by a distance less than 360 degrees and containing an incompressible medium; and a pressurizing device communicating with the medium for pressurizing the medium to radially deform and expand the bore wall from a normal diameter to a larger diameter for enabling a member to be moved into or from the bore, and wherein a depressurizing of the medium causes the bore wall to radially retract to the normal diameter for clamping the member in the bore.

2. The hydraulic chuck according to claim 1 wherein the bore wall includes a longitudinal recess at a location adjacent the at least one cavity.

3. The hydraulic chuck according to claim 1 wherein the chuck body includes a hole communicating with the at least one cavity, and the pressurizing device comprises a thrust screw threadedly mounted in the hole.

4. The hydraulic chuck according to claim 1 wherein the pressurizing device comprises a pump.

5. The hydraulic chuck according to claim 1 wherein the at least one cavity has a circular cross section.

6. The hydraulic chuck according to claim 1 wherein the at least one cavity has a non-circular cross section.

7. The hydraulic chuck according to claim 6 wherein the at least one cavity has a generally I-shaped cross section.

8. The hydraulic chuck according to claim 1 wherein the at least one cavity extends substantially parallel to the axis.

9. The hydraulic chuck according to claim 1 wherein the at least one cavity comprises a plurality of fluidly interconnected cavities.

10. The hydraulic chuck according to claim 9 wherein the bore wall includes longitudinal recesses located adjacent the respective cavities.

11. The hydraulic chuck according to claim 9 wherein the chuck body includes a connecting channel fluidly connected to the cavities.

12. The hydraulic chuck according to claim 11 wherein the shank body includes a hole communicating with the cavities and the connecting channel, and the pressurizing device comprises a thrust screw threadedly mounted in the hole.

13. The hydraulic chuck according to claim 9 wherein the cavities are circumferentially spaced apart.

14. The hydraulic chuck according to claim 9 wherein the cavities are radially spaced apart.

15. The hydraulic chuck according to claim 9 wherein some of the cavities are radially spaced apart and some of the cavities are circumferentially spaced apart.

16. The hydraulic chuck according to claim 9 wherein the cavities have a circular cross section.

17. The hydraulic chuck according to claim 9 wherein the cavities have a generally I-shaped cross section.

18. The hydraulic chuck according to claim 9 wherein the cavities extend substantially parallel to the axis.

19. The hydraulic chuck according to claim 1 wherein the incompressible medium comprises a liquid.

20. The hydraulic chuck according to claim 1 wherein the incompressible medium comprises silicon gel.

21. The hydraulic chuck according to claim 1 wherein the at least one cavity extends circumferentially by a distance less than ninety degrees.

22. The hydraulic chuck according to claim 1 wherein the at least one cavity comprises a plurality of cavities, each cavity extending circumferentially by a distance less than ninety degrees.

23. A method of clamping a member comprising the steps of:

A. inserting the member into a longitudinally extending bore of a chuck body, the body having at least one closed cavity extending generally longitudinally therein in radially spaced relationship to a wall of the bore and to an outer surface of the body, the at least one cavity extending circumferentially by a distance less than 360 degrees and containing an incompressible medium;

B. pressurizing the medium to radially deform and expand the bore wall from a normal diameter to a larger diameter for enabling a member to be moved into the bore;

C. inserting the member into the deformed bore; and

D. depressurizing the medium to cause the bore wall to radially retract to the normal diameter for clamping the member in the bore.

* * * * *